(12) United States Patent
Sawaguchi et al.

(10) Patent No.: US 11,221,280 B2
(45) Date of Patent: Jan. 11, 2022

(54) METHOD OF PREPARING BIOLOGICAL TISSUE SAMPLE AND METHOD OF OBSERVING BIOLOGICAL TISSUE SECTION SAMPLE

(71) Applicant: Hitachi High-Tech Corporation, Tokyo (JP)

(72) Inventors: Akira Sawaguchi, Miyazaki (JP); Takahito Hashimoto, Tokyo (JP); Eiko Nakazawa, Tokyo (JP); Masahiko Ajima, Tokyo (JP); Takeshi Kamimura, Tokyo (JP)

(73) Assignee: Hitachi High-Tech Corporation, Tokyo (JP)

( * ) Notice: Subject to any disclaimer, the term of this patent is extended or adjusted under 35 U.S.C. 154(b) by 109 days.

(21) Appl. No.: 16/650,970

(22) PCT Filed: Oct. 25, 2017

(86) PCT No.: PCT/JP2017/038456
§ 371 (c)(1),
(2) Date: Mar. 26, 2020

(87) PCT Pub. No.: WO2019/082293
PCT Pub. Date: May 2, 2019

(65) Prior Publication Data
US 2020/0232891 A1 Jul. 23, 2020

(51) Int. Cl.
*G01N 1/30* (2006.01)
*G01N 1/28* (2006.01)
(Continued)

(52) U.S. Cl.
CPC ............... *G01N 1/30* (2013.01); *G01N 1/286* (2013.01); *G01N 1/2813* (2013.01);
(Continued)

(58) Field of Classification Search
CPC ........ G01N 1/30; G01N 1/2813; G01N 1/286; G01N 23/2202; G01N 23/2251; G01N 2201/2873
(Continued)

(56) References Cited

U.S. PATENT DOCUMENTS

2002/0179812 A1   12/2002   Kochi et al.
2007/0180965 A1*  8/2007    Ito .......................... G01N 1/06
                                                        83/73
(Continued)

FOREIGN PATENT DOCUMENTS

JP    2001-148232 A    5/2001
JP    2002-270127 A    9/2002
(Continued)

OTHER PUBLICATIONS

Japanese-language Office Action issued in Japanese Application No. 2019-549734 dated Apr. 13, 2021 with English translation (eight (8) pages).

(Continued)

*Primary Examiner* — Nicole M Ippolito
(74) *Attorney, Agent, or Firm* — Crowell & Moring LLP (57) ABSTRACT

The invention provides a method of preparing a biological tissue sample and a method of observing a biological tissue section sample that enable stereoscopic observation of a biological tissue easily and rapidly without destroying a biological tissue piece. The method of observing a biological (Continued)

tissue sample according to the invention is a method in which stereoscopic morphology of a biological tissue sample is observed, and the method includes: cutting out a sample having a thickness of 15 to 50 μm from a sample block obtained by fixing, dehydrating, and paraffin-embedding a sample cut out from a biological tissue; transferring the sample to a surface-treated slide glass; stretching the sample on the slide glass; performing deparaffinization processing; then, staining the sample with a heavy metal-based staining agent; and observing the stained sample with a scanning electron microscope.

13 Claims, 8 Drawing Sheets

(51) Int. Cl.
*G01N 23/22* (2018.01)
*G01N 23/2202* (2018.01)
*G01N 23/2251* (2018.01)

(52) U.S. Cl.
CPC ..... *G01N 23/2202* (2013.01); *G01N 23/2251* (2013.01); *G01N 2001/2873* (2013.01)

(58) Field of Classification Search
USPC .......... 250/306, 307, 309, 310, 311, 440.11, 250/441.11, 442.11, 443.1
See application file for complete search history.

(56) References Cited

U.S. PATENT DOCUMENTS

| 2012/0223228 | A1 | 9/2012 | Galloway |
| 2013/0052331 | A1* | 2/2013 | Kram ................... G01N 1/2813 427/2.11 |
| 2014/0287456 | A1* | 9/2014 | Angros ................. G01N 1/286 435/40.52 |
| 2015/0293341 | A1* | 10/2015 | Kram .................... G01N 1/312 359/395 |

FOREIGN PATENT DOCUMENTS

| JP | 2008-286694 A | 11/2008 |
| JP | 2009-80108 A | 4/2009 |
| JP | 4676339 B2 | 4/2011 |
| JP | 5905910 B2 | 4/2016 |
| JP | 2017-9334 A | 1/2017 |
| JP | 2017-96784 A | 6/2017 |

OTHER PUBLICATIONS

International Search Report (PCT/ISA/210) issued in PCT Application No. PCT/JP2017/038456 dated Jan. 30, 2018 with English translation (five pages).
Japanese-language Written Opinion (PCT/ISA/237) issued in PCT Application No. PCT/JP2017/038456 dated Jan. 30, 2018 (five pages).

* cited by examiner

SLICE
※ THICKNESS=15 TO 50 μm

Fig. 2B

TO SLIDE GLASS

Fig. 2C

STRETCH

Fig. 2D 1.0% URANIUM ACETATE

REYNOLDS LEAD SOLUTION

PLACED ON SEM SAMPLE STAGE

PRESENT METHOD

OPTICAL IMAGE H&E

SAMPLE WITH THICKNESS
OF 30 μM, PRESENT METHOD

Fig. 5B

OPTICAL IMAGE OF SAMPLE WITH
NOMAL THICKNESS IN RELATED ART

600 TIMES

Fig. 6A 1,200 TIMES

Fig. 6B

3,000 TIMES

| | TEM | OPTICAL IMAGE | FIRST EMBODIMENT | SECOND EMBODIMENT | GENERAL SEM |
|---|---|---|---|---|---|
| INSTRUMENT | TEM | OPTICAL MICROSCOPE | SEM | SEM | SEM |
| IMAGE SIGNAL | TRANSMISSION ELECTRON | TRANSMISSION LIGHT | BACK-SCATTERING ELECTRON/ (SECONDARY ELECTRON) | SECONDARY ELECTRON/ (BACK-SCATTERING ELECTRON) | SECONDARY ELECTRON |
| ATMOSPHERE | HIGH VACUUM | ATMOSPHERIC PRESSURE | LOW VACUUM | HIGH VACUUM | HIGH VACUUM |
| PRE-PROCESSING | FIXING AND DEHYDRATION | FIXING AND DEHYDRATION | FIXING AND DEHYDRATION | FIXING AND DEHYDRATION | CRITICAL POINT DRYING |
| EMBEDDING AGENT | RESIN | PARAFFIN | PARAFFIN | PARAFFIN | N/A |
| SLICING THICKNESS [μm] | ~1 | ~5 | 30 (15~50) | 30 (15~50) | N/A |
| STAINING AGENT | HEAVY METAL SUCH AS Pb/U | H&E | HEAVY METAL SUCH AS Pb/U | (Pb/U) | N/A |
| SURFACE PROCESSING | N/A | N/A | N/A | (IONIC LIQUID) | METAL EVAPORATION |
| OBSERVATION POSITION | INSIDE | INSIDE | SURFACE AND INSIDE | MAINLY SURFACE | SURFACE |

METHOD OF PREPARING BIOLOGICAL TISSUE SAMPLE AND METHOD OF OBSERVING BIOLOGICAL TISSUE SECTION SAMPLE

TECHNICAL FIELD

The invention relates to a method of preparing a biological tissue sample and a method of observing a biological tissue sample.

BACKGROUND ART

In research and study of a biological tissue in fields of medical biology, regenerative medicine, and drug discovery, stereoscopic observation of morphology of the biological tissue is required. For example, in regenerative medicine, a mini organ that is an origin of an organ is created from iPS cells. Mini organs are also used for screening in research and development in drug discovery. Needs for elucidating stereoscopic microstructures of organs or tissues by investigating further sliced such mini organs are rapidly growing.

However, stereoscopic observation of the biological tissue is not always easy due to ability (magnification, focus depth, and resolution) of the microscope used for observation, and has various problems. Since cells constituting a biological tissue such as an organ have an average size of about 15 μm in a depth direction, it is required to comprehensively observe the structure of a biological tissue composed of plural cells in units of several tens of micrometers in the depth direction in order to stereoscopically grasp the tissue structure.

Due to the restriction of the wavelength of light, resolution of an optical microscope is about several hundred nm, and a maximum magnification is about several 1000 times. Since resolution of a naked eye is about 0.1 mm, it is difficult to observe details of a biological tissue with an optical microscope. Further, in a normal optical microscope, focus depth is insufficient, and it is difficult to comprehensively observe a biological tissue having a thickness of several tens of micrometers. In the optical microscope, for example, in order to avoid deterioration of resolution due to diffraction of light, a sample side aperture angle is set to about several hundred mrad. For example, when the sample side aperture angle is set to 500 mrad, the focus depth is about 4 μm in order to keep the least confusion circle on the sample within 1 μm. Therefore, a thickness of the sample needs to be reduced to 4 μm or less. Therefore, the biological tissue needs to be sliced to a thickness of 5 μm or less for observation, and sufficient resolution may not be obtained, during observing of the biological tissue with an optical microscope.

In addition, although a method of allowing the biological tissue to be transparent so as to three-dimensionally observing the tissue using a confocal laser microscope or a sheet illumination microscope has been developed, there is a problem that time required for observation is long since 3 to 4 days are required for a sample to be transparent.

On the other hand, a method of observing a biological tissue by three-dimensional reconstruction using a transmission electron microscope (TEM) has also been proposed. The transmission electron microscope (TEM) has a resolution of about 0.2 nm and enables to observe at a magnification of about 500,000 times at maximum. As described above, the observation method using the TEM has a sufficiently high resolution, but has a limitation on sample thickness due to transmittance. Specifically, in the TEM, a sample is observed by being irradiated with relatively parallel electron beam of about 1 mrad. However, since the necessity of an electron beam that causes very strong interactions with the sample to transmit, sample thickness must be prepared to less than 1 μm. As described above, although TEM is advantageous for analyzing a structure inside cells, TEM is not suitable for analyzing stereoscopic structure of the tissue.

On the other hand, a scanning electron microscope (SEM) has an ability to perform analysis at a tissue level stereoscopically with high resolution. In the SEM, a diameter of electron beams is converged to 2 to 3 nm or less at the observation, and the diameter of the electron beams may define the resolution, so that an object can be observed at a magnification of 100,000 times or more at maximum.

However, it is necessary to prepare a biological tissue by freeze-cleave method for observing its stereoscopic structure with an SEM. In this case, there are problems that a dedicated device for freezing the sample is required, and that it is difficult to cleave the sample at aimed position to observe. In addition, in the freeze-cleave method, it is necessary to coat the sample surface with thin metal layer, and only morphology of the surface can be observed.

As a method of observing a biological tissue piece using an SEM, a cutting block surface observation method (SBF-SEM method) is also known, for example, according to PTL 1. The method is a method in which a dedicatedly designed microtome is incorporated into an SEM and cross-sectional observation with the SEM and surface cutting of a biological tissue piece is repeatedly performed and hundreds to thousands of continuous cross-sectional images are synthesized to obtain a stereoscopic image. A dedicatedly designed microtome-attached stage has been commercialized as a unit that can be retrofitted to a commercially available SEM and is becoming popular. However, in the SBF-SEM method, it is necessary to repeatedly cutting the sample to several tens of nm several hundred times or several thousands of times, and the measurement takes time and the sample is cut away.

An FIB-SEM method described in PTL 2, for example, is also known as another technique for analyzing a biological tissue piece stereoscopically. Similarly as the SBF-SEM method, it is necessary to repeatedly cut the sample several hundreds of times or several thousands of times in the technique, and the measurement takes time and the sample is cut away.

As a method of evaluating a skin sample, PTL 3 discloses a technique of observing a sample having a thickness of 1 to 100 embedded in paraffin for SEM observation of the skin sample. However, in the observation technique introduced here, cells are digested by formic acid or the like from the sample taken from a skin tissue, only collagenous fibers between cells are left and are observed after immunological staining, it is necessary to secure enough thickness to leave inherently small amounts of collagen fibers, and the thickness of an object to be finally observed is reduced. The technique is not the method of observing a structure or morphology of a tissue consisting of cells and intercellular materials.

As described above, although a plurality of methods of observing a biological tissue piece using an SEM have been proposed, the stereoscopic structure of a biological tissue piece cannot be easily and rapidly observed by none of these methods.

As described above, although it has been required to perform stereoscopic observation of a biological tissue easily and rapidly without destroying the biological tissue piece, it is difficult to perform the stereoscopic observation by a method in related art.

CITATION LIST

Patent Literature

PTL 1: Japanese Patent No. 5905910
PTL 2: Japanese Patent No. 4676339
PTL 3: JP-A-2009-80108

SUMMARY OF INVENTION

Technical Problem

In view of the problem, the invention provides a method of preparing a biological tissue sample and a method of observing a biological tissue section sample that enable stereoscopic observation of the biological tissue easily and rapidly without destroying the biological tissue section.

Solution to Problem

A method of observing a biological tissue sample according to the invention is a method in which stereoscopic morphology of a biological tissue sample is observed, and the method includes: cutting out a sample having a thickness of 15 to 50 μm from a sample block obtained by fixing, dehydrating, and paraffin-embedding a sample cut out from a biological tissue; transferring the sample to a slide glass; stretching the sample on the slide glass; performing deparaffinization processing; then, staining the sample with a heavy metal-based staining agent; and observing the stained sample with a scanning electron microscope.

In addition, a method of preparing a biological tissue sample for observation with a scanning electron microscope includes: cutting out a sample having a thickness of 15 to 50 μm from a sample block obtained by fixing, dehydrating, and paraffin-embedding a sample cut out from a biological tissue; transferring the sample to a surface-treated slide glass; stretching the sample on the slide glass; performing deparaffinization processing; and then staining the sample with a heavy metal-based staining agent.

Advantageous Effect

According to the method of observing a biological tissue specimen sample and the method of preparing a biological tissue sample of the invention, it is possible to enable stereoscopic observation of the biological tissue easily and rapidly without destroying the biological tissue section.

DESCRIPTION OF EMBODIMENTS

Next, embodiments of the invention will be described with reference to the drawings.

First Embodiment

Figure 1:
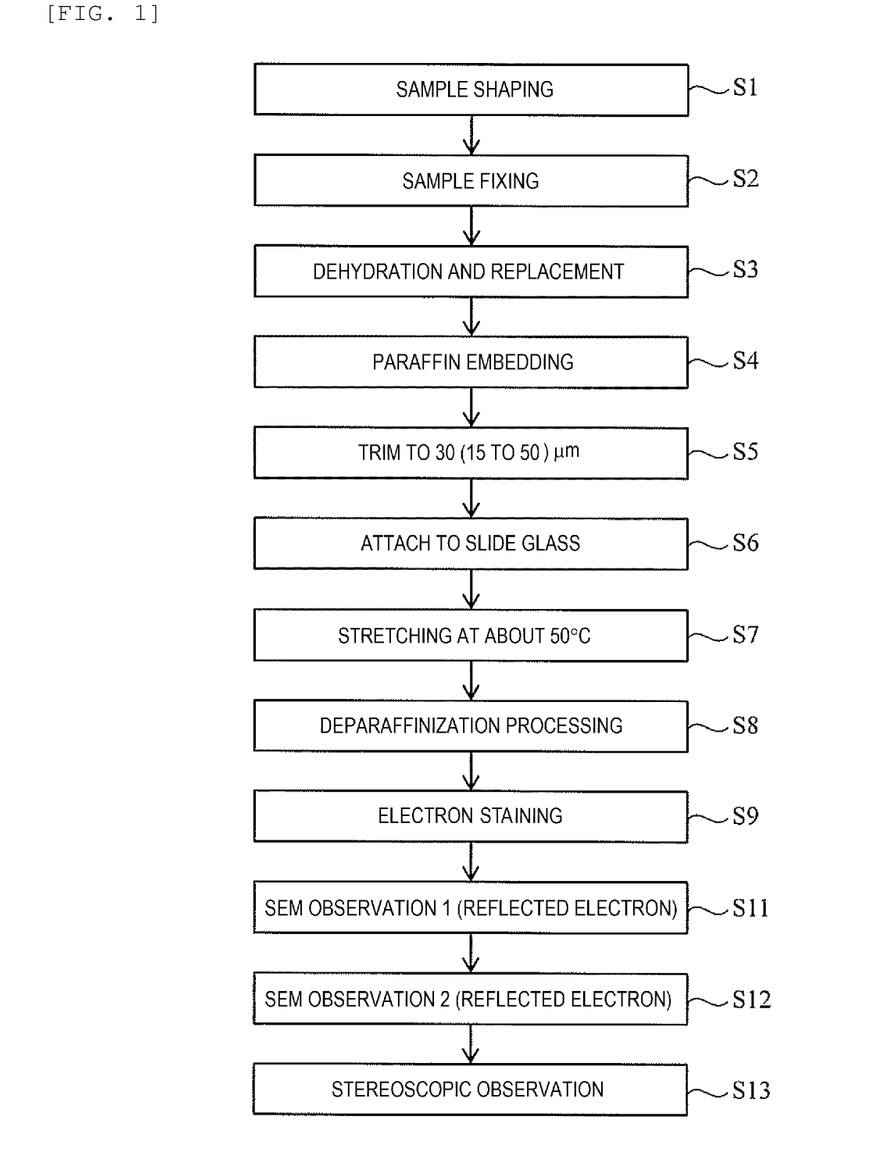
FIG. 1 is a flowchart showing a procedure of a method of observing a biological tissue sample and a method of preparing the biological tissue sample according to the first embodiment.

First, a method of observing a biological tissue sample and a method of preparing a biological tissue sample according to the first embodiment will be described with reference to a flowchart of FIG. 1 and a schematic diagram of FIG. 2.

First, a sample (for example, a tissue piece, or a cell mass of, such as, an organ or a mini organ manufactured from iPS cells) is shaped (trimmed) into a substantially rectangular parallelepiped of several mm square with a single-edge razor (Step S1). When an original size is about 1 mm square as a mini organ, trimming is omitted, and the processing proceeds to a next step S2.

Thereafter, the trimmed sample is fixed with formalin liquid or the like (Step S2).

Next, dehydration processing and replacement processing is performed on the fixed sample (Step S3). The dehydration processing is performed by, for example, impregnating the sample fixed by the formalin solution with an ethanol solution. Ethanol has a function of preventing paraffin to be described later from infiltrating into a biological tissue. The replacement processing is performed using a reagent such as xylene or chloroform.

Instead of the above-mentioned fixing with the formalin solution, it is also possible to carry out a fixing processing by isopentane or propanol freezing, and then perform a freeze replacement.

Next, dissolved paraffin infiltrates into the sample after dehydration and replacement to perform paraffin embedment (Step S4). The paraffin embedded biological tissue can be semi-permanently stored at a room temperature.

Figure 2A:
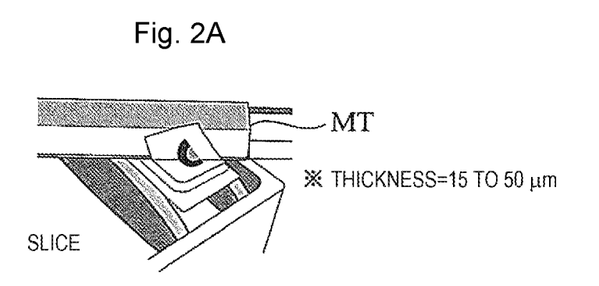
FIGS. 2A to 2H are schematic diagrams showing a procedure of the method of observing the biological tissue sample and the method of preparing the biological tissue sample according to the first embodiment.

When the paraffin is solidified, a sample piece that is embedded in the paraffin is trimmed to about 1 mm between upper and lower surfaces, about 3 mm between side surfaces for the paraffin to form a sample block, and then the sample block is further sliced using a microtome MT to prepare a sample piece for SEM observation (Step S5, and FIG. 2(a)). The thickness of the sample piece for this SEM observation is 15 to 50 µm (30 µm as a preferred example) equivalent to 3 to 10 times as compared with 4 to 5 µm commonly used in optical microscopic observation. Although in the SBF-SEM method or the FIB-SEM method, which is also an observation method using an SEM, it is necessary to continuously cut out sections with a thickness of several tens of nm and then synthesize a plurality of images, in the method of the present embodiment, a biological tissue can be observed in one section having the thickness of 15 to 50 µm. Therefore, compared to the observation method in the related art, preparation of the sample is improved in simplicity, rapidity, and versatility.

A microtome replacement blade having a blade edge angle of 35° is generally used when a sample is sliced to a thickness of 4 to 5 µm for observation with an optical microscope. However, when the sample is sliced to a thickness of 15 to 50 µm, preferably 30 µm as in the present embodiment, it is possible to prevent cracking of a section cut out thickly by using a microtome replacement blade having a blade edge angle of 22° (for example, a microtome replacement blade product number A22 manufactured by Feather Safety Razor Co., Ltd., or the like).

Figure 2B:
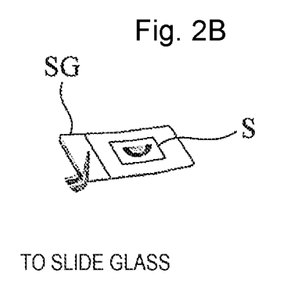
Figure 2C:
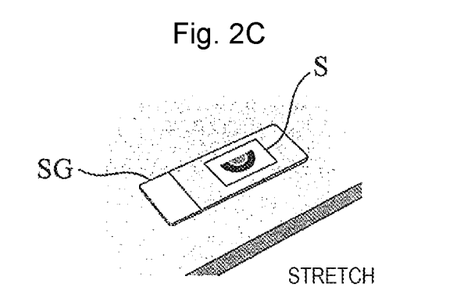

The sample piece S for SEM observation cut out to a thickness of 15 to 50 µm is attached (transferred) to a slide glass SG that is subjected to a predetermined surface treatment (Step S6, and FIG. 2(b)). Thereafter, the slide glass SG is heated until the temperature of the sample piece S for SEM observation reaches 45° C. to 55° C., preferably 50° C., and the sample piece S for SEM observation is stretched on the slide glass SG at the temperature (Step S7, and FIG. 2(c)).

The heating temperature of the slide glass SG which is 45° C. to 55° C. is a temperature higher than 40° C. that is generally used in the related art. In the present embodiment, it is also possible to heat the slide glass SG to 40° C., which is such a general temperature.

However, the thickness of the sample piece S for SEM observation of the present embodiment is 15 to 50 µm, preferably 30 µm, and extension on the slide glass SG may be difficult. In such a case, it is effective to stretch the sample on a hot plate (not shown) heated to a temperature of 45° C. to 55° C., preferably about 50° C., which is higher than about 40° C. that is frequently used in sections having a thickness of 4 to 5 µm. Although the section having a thickness of 30 µm is likely to be peeled off in a course of staining on a normal slide glass SG (it is likely to be peeled off when the sample is thick), the problem of peeling off is solved by using, for example, a slide glass which is specially coated with NEW silane II made by Muto Pure Chemicals Co., Ltd.

Thereafter, deparaffinization processing is performed on the sample piece S for SEM observation extended on the slide glass SG to remove the paraffin added to the sample piece S (Step S8). In the deparaffinization processing, for example, the sample piece S placed on the slide glass SG is immersed in xylene for a predetermined time, and then the sample piece S is immersed in solvents such as ethanols with concentrations being decreased stepwise. Finally, water washing is performed, and the deparaffinization processing is completed.

Figures 2D, 2E:
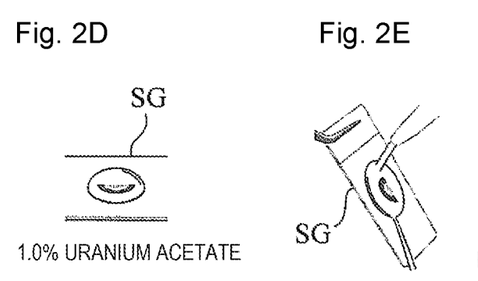
Figures 2F, 2G:
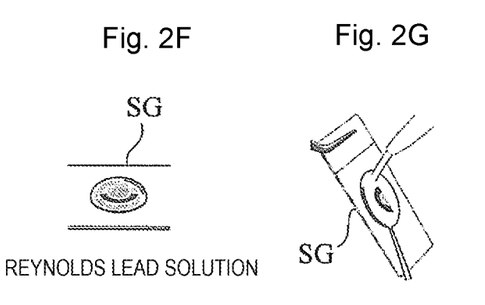
Figure 2H:
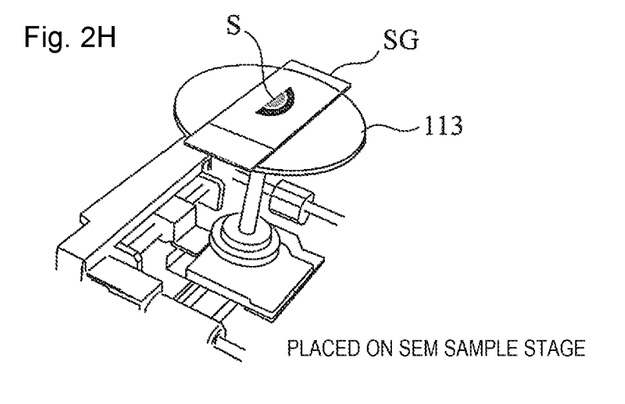

After the paraffin is removed, electron staining is performed on the sample piece S for SEM observation (Step S9). In the electron staining, for example, as shown in FIG. 2(d), a 1.0% uranium acetate solvent is dropped onto the sample piece S for SEM observation and stands by for 5 minutes, and then, as shown in FIG. 2(e), water washing processing is performed over several stages. Thereafter, the deparaffinization processing is performed again. Next, as shown in FIG. 2(f), a Reynolds lead solution as an electron staining agent is dropped and stands by for 3 minutes, and then, further as shown in FIG. 2(g), the water washing processing is performed again, and drying processing is performed. The dried slide glass SG is placed on a stage of an SEM for observation. A staining agent such as osmium tetroxide, platinum blue, and lutetium triacetate can be used instead of any of the above-described lead and uranium staining agents. A combination of the staining agents may be any combination suitable for the properties of an observation region.

The observation of the biological tissue sample with an optical microscope is performed by hematoxylin-eosin staining (H&E staining) the sample after the sample is washed with water. However, as described above, in the first embodiment, the SEM observation is performed similarly to TEM observation, in which the inside of the sample piece is stained with a staining solution containing heavy metal. According to the processing, contrast of a back-scattered electron image can be enhanced. In general, a metal is coated on the sample by sputtering or vacuum deposition in order to prevent electrification of the biological tissue sample for observing the biological tissue sample with an SEM. However, in the present embodiment, metal coating is not performed since inside of the sample is to be observed. In the first embodiment, the problem of electrification is avoided by performing low vacuum SEM observation. In the second embodiment, as to be described later, the problem of electrification is avoided by application of ionic liquid.

Figure 9:
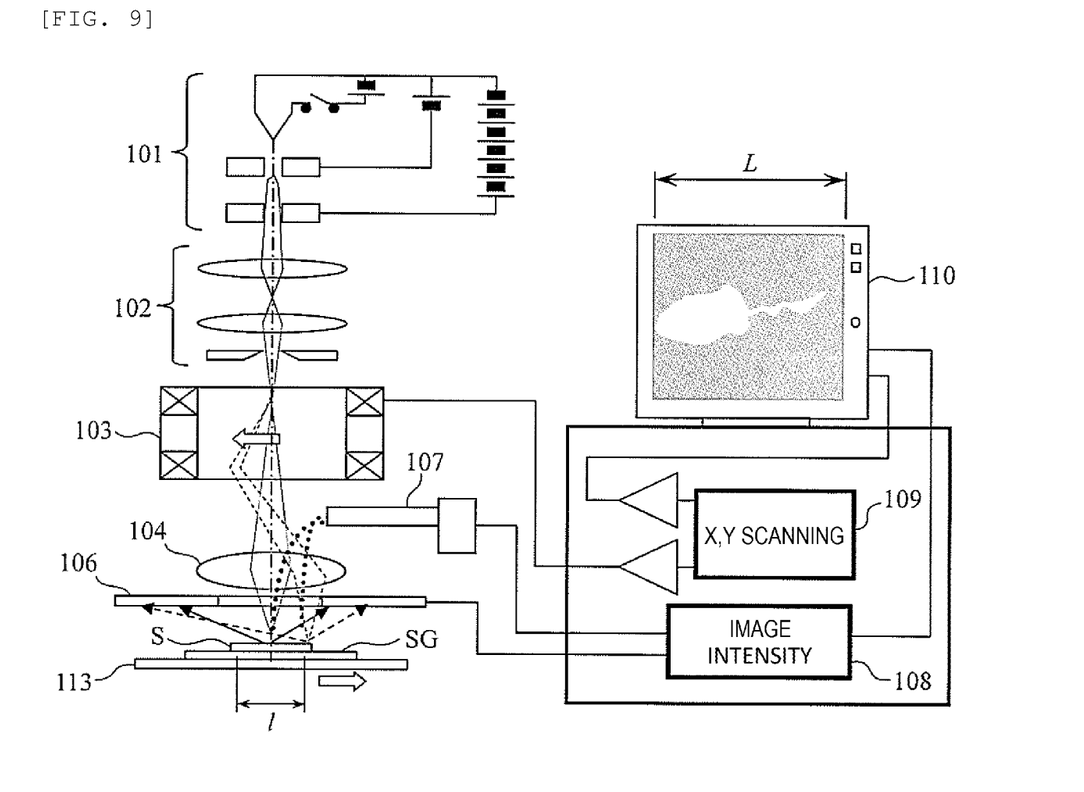
FIG. 9 is a schematic diagram of a general SEM.

FIG. 9 is a schematic diagram of a general SEM. An electron beam emitted from an electron source of an electron gun 101 is converged by an illumination lens system 102 to reduce a diameter of the electron beam, and the sample piece S of the slide glass SG mounted on the stage 113 is illuminated with the electron beam whose diameter is finally reduced to about several nm by an objective lens 104. A range of a length l on the sample piece S is scanned with the electron beam through a scanning coil 103 by an XY scanning power supply 109 in a display device 110.

Signals of secondary electrons and reflected electrons (backscattered electrons) generated from the sample piece S are detected with detectors 107 and 106 suitable for respective signals, and converted into image intensity information by an image processing unit 108. The image intensity information is displayed on the display device with a width L in synchronization with XY scan to form an SEM image. A ratio between the width L of the display device 110 and a swing width l on the sample piece S is a magnification of the image. The swing width l is decreased when the magnification increases.

In observation of a sample using an SEM, electrification of the sample can be prevented by using a low vacuum scanning electron microscope (a low vacuum SEM). An image signal based on the back-scattered electrons and an image signal based on the secondary electrons are obtained in the SEM. Only the image signal based on the back-scattered electrons can be used, or only the image based on the secondary electrons can be used. Further, it is also possible to obtain an image signal obtained by adding the image signal based on the back-scattered electrons and the image signal based on the secondary electrons. A back-scattered electron signal is generally used in the low vacuum SEM.

An observation magnification of the SEM can be set to several 100,000 times at maximum. However, in the case of the present embodiment, the observation magnification may be several 100 times to several 1000 times, and is a magnification that overlaps a part of an observation magnification of the optical microscope.

In the present embodiment, in the SEM, in order to obtain an stereoscopic image, an incident angle (a tilt angle) of the electron beam is changed (varies) in, for example, about +3° and −3° within the same field of view, the back-scattered electrons (or the secondary electrons) are detected at respective tilt angles, two images are taken (Steps S11 and S12), and the images are stereoscopically observed with a stereoscope (not shown) or the like (Step S13).

Instead of changing the incident angle of the electron beam, the two images can be taken by changing the tilt angle of the stage 113 in two ways. One of the two images may be changed to red and the other may be changed to blue to perform stereoscopic observation with anaglyph glasses. Only one image may be taken when the stereoscopic structure of the sample can be sufficiently understood by observing only one image.

Figure 3A:
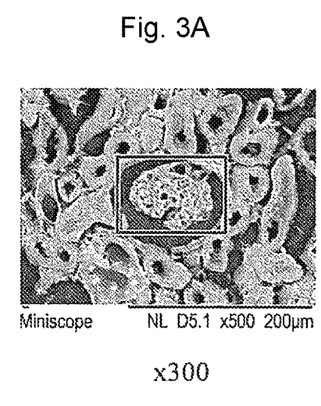
FIGS. 3A to 3C are examples of images obtained by observing a 15 μm-thick paraffin-embedded section of a rat kidney tissue prepared according to the method of the first embodiment.
Figure 3B:
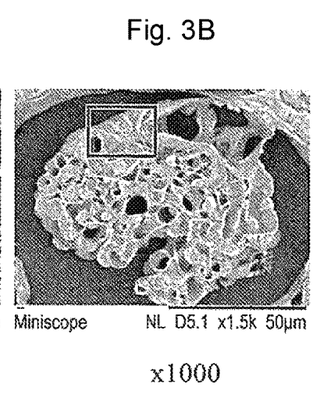
Figure 3C:
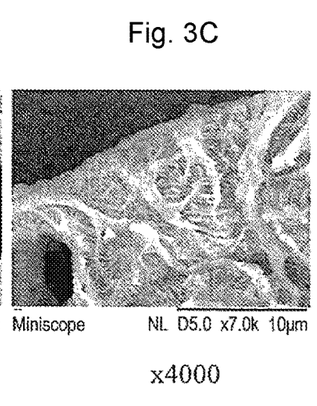

FIG. 3 is an example of an image obtained by observing a 15 μm-thick paraffin-embedded section of a rat kidney tissue prepared according to the method of the present embodiment. FIG. 3(a) is an image obtained when the observation magnification of the SEM is set to 300 times, similarly, FIG. 3(b) is an image at the magnification of 1000 times, and FIG. 3(c) is an image at the magnification of 4000 times. In FIG. 3(a), a luminal structure of a renal corpuscle and tubules can be observed, in FIG. 3(b), a clear luminal structure of a renal glomerulus can be observed, and in FIG. 3(c), a protruding structure of podocytes is observed.

Figure 4A:
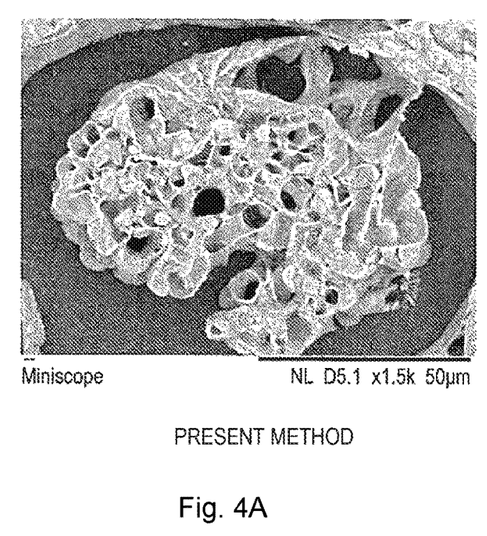
FIGS. 4A and 4B show a comparison between an observation image according to the first embodiment and an observation image according to an optical microscope image in a related art.
Figure 4B:
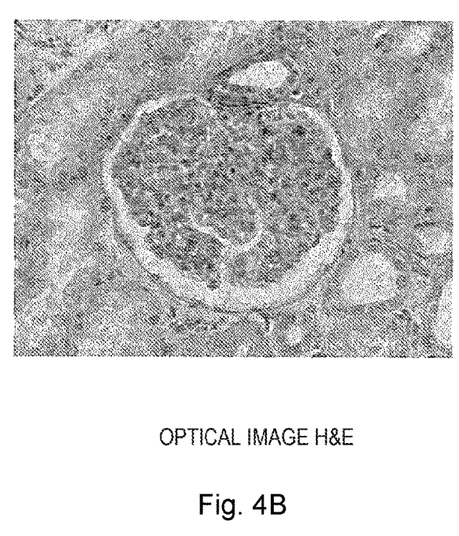

FIG. 4 shows a comparison between an observation image according to the present embodiment and an observation image according to an optical microscope in the related art. FIG. 4(a) is the same image as FIG. 3(b), and FIG. 4(b) is an image of the renal glomerulus at approximately the same magnification, which was imaged by an optical microscope after hematoxylin-eosin staining (H&E staining). Although the image in FIG. 4(b) has color information, the luminal structure is not explicitly imaged, and it is difficult to grasp a detailed structure thereof.

Figure 5A:
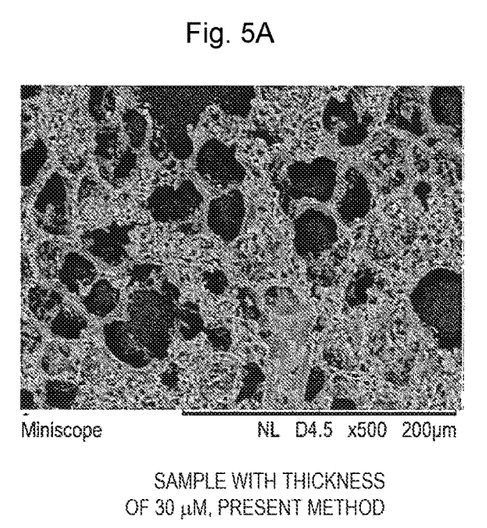
FIGS. 5A and 5B show a comparison between an observation image of a section sample S for SEM observation cut out to a thickness of 30 μm according to the first embodiment and an optical microscope observation image of a slice cut out to a thickness of 4 to 5 μm.
Figure 5B:
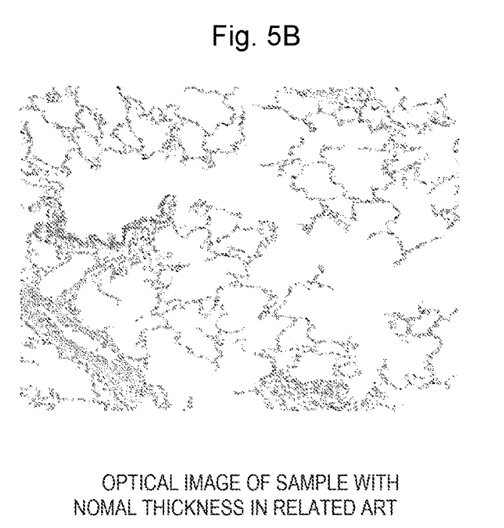

FIG. 5 shows a comparison between an observation image of the sample piece S for SEM observation cut out to a thickness of μm according to the present embodiment and the optical microscope observation image of the section cut out to a thickness of 4 to 5 μm. FIG. 5(a) is an observation example of a rat lung alveoli sample prepared at a thickness of 30 μm, and FIG. 5(b) is an observation image of an optical microscope when the same sample is cut out to a thickness of 4 to 5 μm suitable for observation of an optical microscope. In FIG. 5(a), a stereoscopic structure of alveolar septa and a front surface of an alveolar septa can be observed, but the stereoscopic structure of the rat alveolus sample cannot be grasped in the optical microscope image of FIG. 5(b) in which the sample having no substantial thickness, only morphology of one cross section is shown.

Figure 6A:
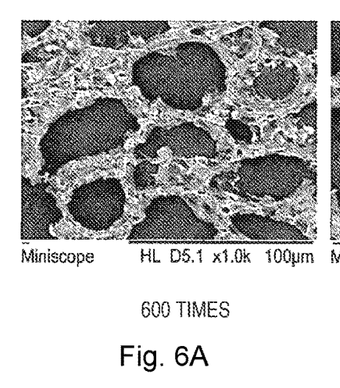
FIGS. 6A to 6C show a first example of observation images of a rat lung tissue prepared at a thickness of 20 μm according to the first embodiment.
Figure 6B:
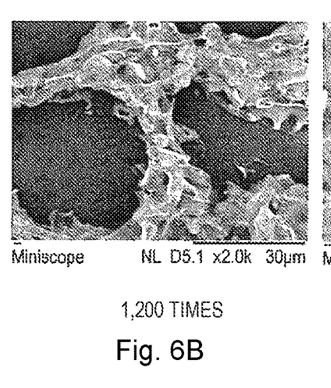
Figure 6C:
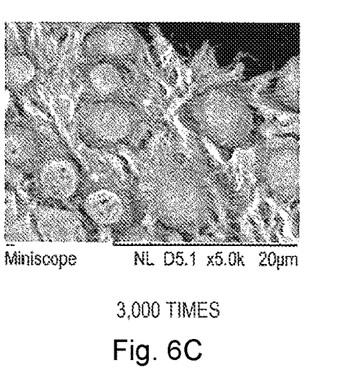

FIG. 6 shows a first example of an observation image of a rat lung tissue prepared at a thickness of 20 μm according to the present embodiment. FIG. 6(a) is an observation image obtained when the observation magnification of the SEM is set to 600 times, FIG. 6(b) is an observation image at the magnification of 1200 times, and FIG. 6(c) is an observation image at the magnification of 3000 times. In FIGS. 6(a) and 6(b), the structure of the alveoli can be observed, and in FIG. 6(c), bronchiolar ciliate epithelium and circular mucus cells are observed.

Figure 7:
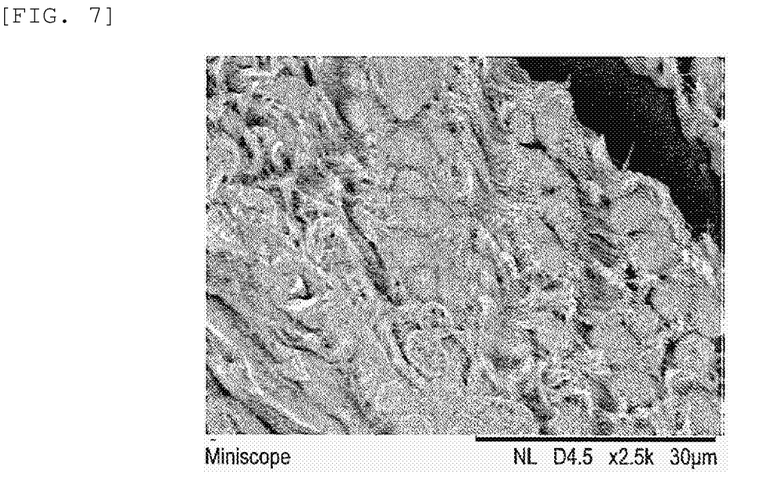
FIG. 7 shows a second example of an observation image of a rat lung tissue prepared at a thickness of 30 μm according to the first embodiment.

FIG. 7 shows a second example of an observation image of a rat lung tissue prepared at a thickness of 30 μm according to the present embodiment, and ciliate epithelium of a cell is visible. In general, although a cross-section obtained by cutting the figure in a vertical direction is often observed, such an image is generally introduced in a literature or the like, by supplementing the figure, it is possible to visually grasp thickness and length of a ciliate, and surface morphology, size, and distribution density of ciliate cells and secretory granules, and the like.

Figure 8:
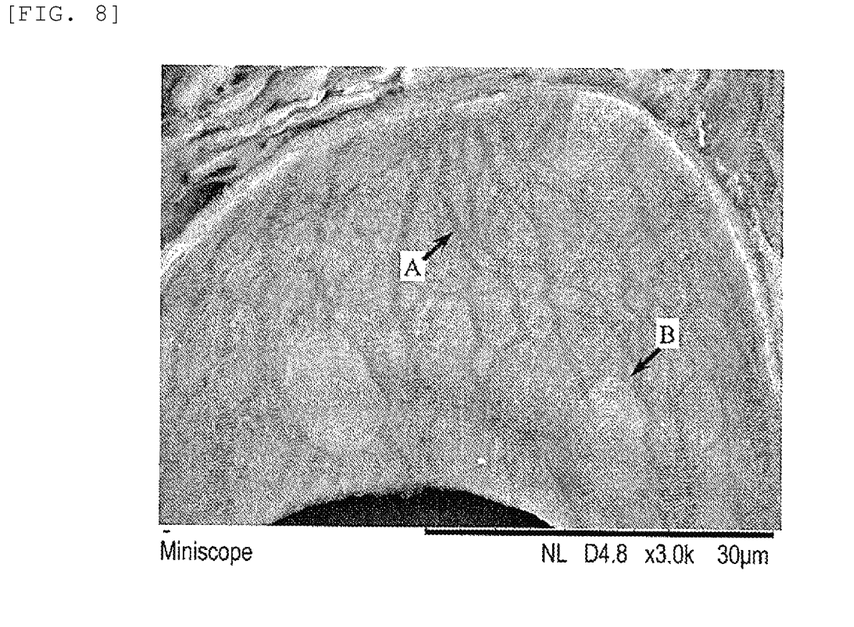
FIG. 8 shows an example of an observation image of a rat vascular tissue sample prepared at a thickness of 30 μm according to the first embodiment.

FIG. 8 shows an example of an observation image of a rat vascular tissue sample prepared at a thickness of 30 μm according to the present embodiment. Since the surface of the sample is not coated with a metal and is electron stained, an internal structure of the tissue can be seen through by using the back-scattered electron signal (mark A in FIG. 8), and new knowledge that cannot be seen by SEM sample preparation and observation methods with freeze cutting coating in the related art is obtained, such as a structure of a connective tissue inside a blood vessel and nuclei of endothelial cells (mark B in FIG. 8).

[Effect]

Effects of the first embodiment will be described below. In the first embodiment, the sample piece S having a thickness of 15 to 50 μm is cut out from the sample block obtained by fixing, dehydration and paraffin-embedding the sample cut out from the biological tissue with the microtome replacement blade having a blade edge angle of 22°. Thereafter, the sample piece S is transferred to the slide glass SG, the transferred sample piece S is stretched on the slide glass SG and deparaffinization processed. Thereafter, the sample piece S is stained by a heavy metal-based staining agent for observation with an SEM. Then, the stained sample piece S is observed with a scanning electron microscope. Since the paraffin-embedded section is observed with the SEM, it is possible to observe a fine structure that cannot be observed by an optical microscope. In addition, the sample needs to be sliced to about several μm when being observed with an optical microscope, but in the invention, since the SEM is used for observation, the sample piece S having a thickness of 15 to 50 μm can be observed comprehensively (without further slicing). Even if the sample piece S has a large thickness such as 50 μm, a stereoscopic image in which the structure is clearly imaged from the top surface to the back surface of the sample piece S can be obtained due to a large focus depth of the SEM. It is not possible to observe the sample piece S having such a large thickness in real time by the optical microscope, and it is necessary to continuously acquire images of a sliced sample piece and synthesize acquired images even by using an SEM according to the SBM-SEM method in the related art.

Since the biological tissue embedded in paraffin can be semi-permanently stored at the room temperature, new knowledge can be expected to be obtained by applying the present method to a sample that was embedded a few tens of years before and cannot be analyzed with high precision at that time. In a case of a pathological tissue, since it is difficult to obtain knowledge due to insufficient resolution by using an optical microscope, a progress of a disease may not be determined, but accurate diagnosis can be performed by obtaining detailed knowledge by the SEM. In addition, even the tissue section has a thickness of 15 μm or more, which is thicker than a section provided in the optical microscope, the tissue section can be comprehensively observed in real time. Since the sample does not disappear as in the SBF-SEM method or the FIB-SEM method, the observation sample can be stored semi-permanently. With such a characteristic, it is also possible to acquire information quickly and to test the result again or verify the result by another means.

Second Embodiment

Figure 10:
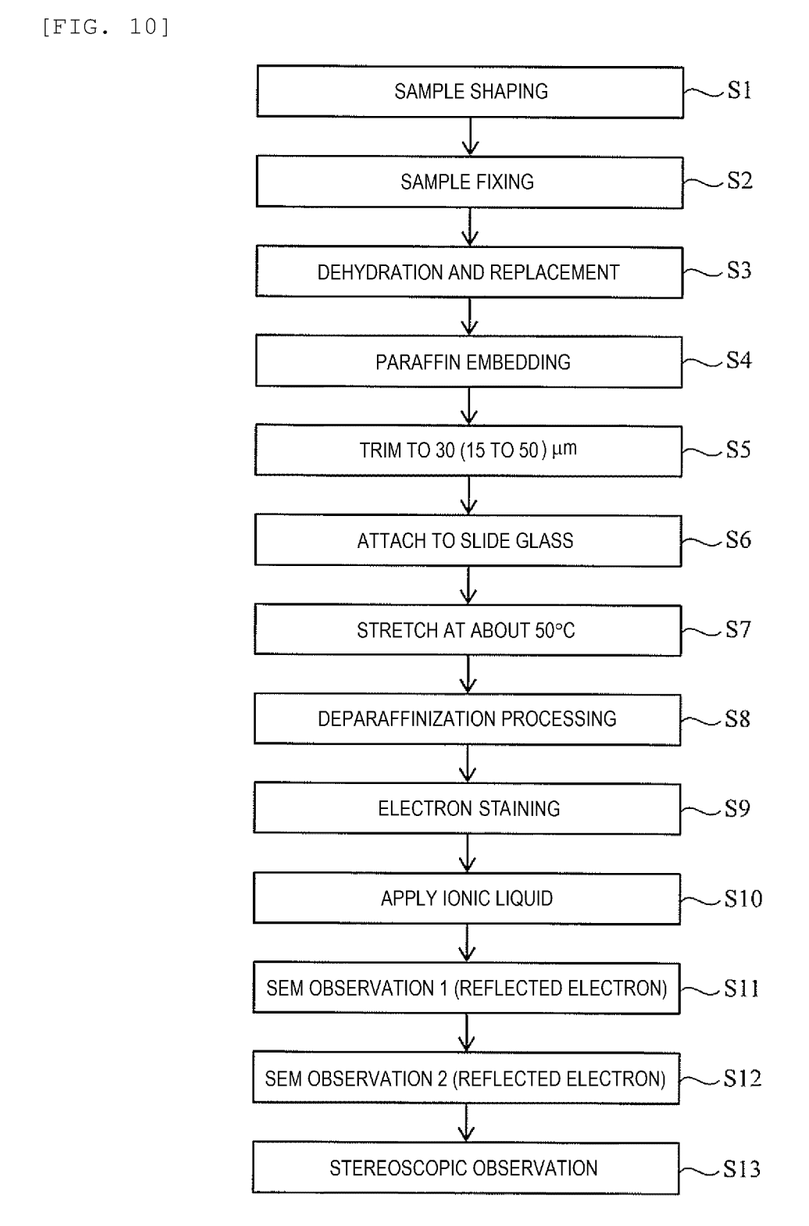
FIG. 10 is a flowchart of the second embodiment.

Next, a method of observing a biological tissue sample and a method of preparing a biological tissue sample according to the second embodiment will be described with reference to a flowchart of FIG. 10.

The observation method of the second embodiment is performed in a high vacuum atmosphere. Therefore, after the electron staining (S9), the ionic liquid is added to the sample piece S by applying the ionic liquid to the surface of the sample piece S or impregnating the sample piece S into the ionic liquid (Step S10). Other steps are the same as those of the first embodiment (FIG. 1).

When a high vacuum SEM is used, electric charge accumulation on the sample piece S is increased, and the secondary electrons may be affected. However, by adding the ionic liquid to the surface of the sample piece S, electric charge accumulation (charge up) on the sample piece S can be prevented, thereby an image based on the secondary electrons can be easily observed. However, in this case, the observation of the sample piece S is performed mainly on the surface. The images of lower part of the surface can be imaged, and thus it is possible to observe the sample stereoscopically.

In the second embodiment, observation using back-scattered electrons is possible when electrification is not a problem.

Third Embodiment

Next, a method of observing a biological tissue sample and a method of preparing a biological tissue sample according to the third embodiment will be described with reference to FIG. 11.

Figure 11:
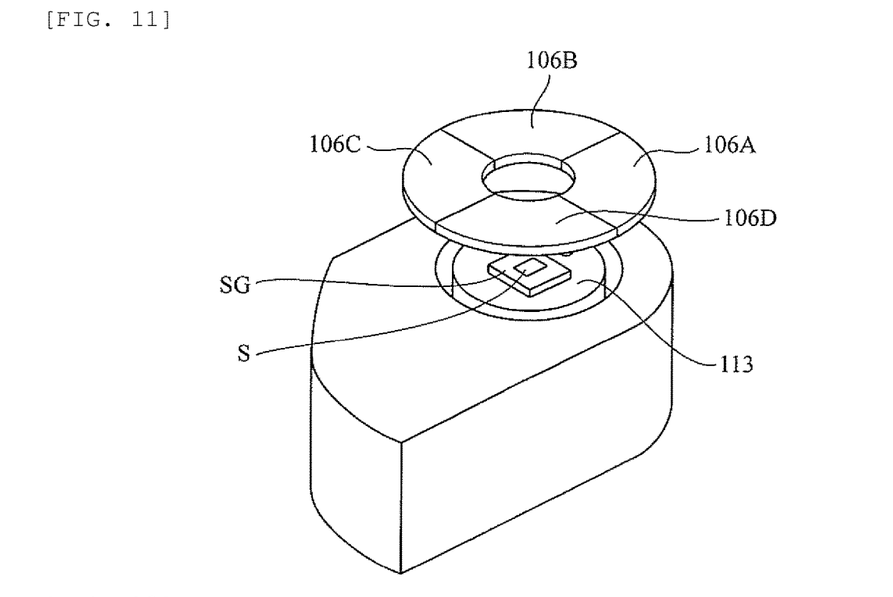
FIG. 11 is a diagram illustrating a structure of an SEM used in the third embodiment.

In the third embodiment, as shown in FIG. 11, in an SEM, a plurality of, for example, four back-scattered electron detectors 106A to 106D that are obtained by division are used as a detector 106. Each of the four back-scattered electron detectors 106A to 106D has a detection surface in a direction that matches an azimuth angle of back-scattered electrons. That is, the detector 106 is divided into a plurality of parts, the back-scattered electron detectors 106A to 106D, according to the azimuth angles of the back-scattered electrons, and an image can be independently formed for each azimuth angle. Accordingly, images based on the back-scattered electrons can be clearer.

Figure 12:
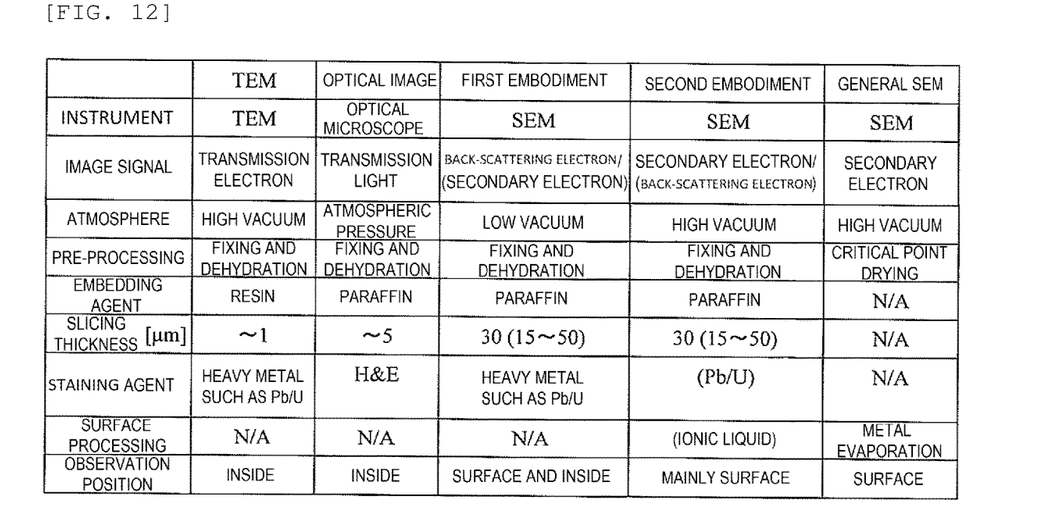
FIG. 12 is a comparison table comparing the embodiment of the invention, general SEM observation, TEM observation, and an optical microscope observation.

Finally, the embodiments of the invention are compared with the general SEM observation, the TEM observation, and the optical microscope observation with reference to a comparison table of FIG. 12. As is clear from FIG. 12, according to the present embodiments, after being fixed, dehydrated and the like, the sample is paraffin-embedded and cut out to a thickness of 15 to 50 µm, and thus the stereoscopic structure of the biological tissue can be easily observed. Although fixing and dehydrating processing of such a sample is performed in a case of observation with an optical microscope, the thickness of the sample is cut to 5 µm or less for the above-described reason, and thus a stereoscopic structure cannot be observed. On the other hand, in the general SEM observation, metal coating is performed before performing the observation, and thus a stereoscopic structure cannot be observed.

In this regard, in the embodiment, the sample is fixed, dehydrated, and paraffin-embedded, and cut out to a thickness of 15 to 50 µm, and such processing has not been performed in any observation with an SEM, a TEM, or an optical microscope. According to the invention, it is possible to conveniently observe the stereoscopic structure of the biological tissue sample without destroying the tissue for the first time by carrying out such sample processing.

While certain embodiments have been described, these embodiments have been presented by way of example only, and are not intended to limit the scope of the invention. Furthermore, various omissions, substitutions and changes in the form of the embodiments described herein may be made without departing from the spirit of the invention. These embodiments and modifications thereof are contained in the scope and gist of the invention and are contained in the invention described in the claims and the equivalent scope thereof.

INDUSTRIAL APPLICABILITY

The invention can be applied to observing instruments and educational aids in biology, histology, pathology, and the like, and can be used in research and development in diagnostics, regenerative medicine, pharmaceuticals, cosmetics, and foods.

REFERENCE SIGN LIST 101 electron gun
102 illumination lens system
103 scanning coil
104 objective lens
106, 106A to 106D back-scattered electron detector
107 secondary electron detector
108 image processing unit
109 scanning power supply
110 display device
113 stage
S sample piece for observation
SG slide glass

The invention claimed is:

1. A method of observing a biological tissue sample in which stereoscopic morphology of a biological tissue sample is observed, comprising:
    cutting out a sample having a thickness of 15 to 50 µm from a sample block obtained by fixing, dehydrating, and paraffin-embedding a sample cut out from a biological tissue;
    transferring the sample to a slide glass;
    stretching the sample on the slide glass and performing deparaffinization processing;
    then, staining the sample with a heavy metal-based staining agent; and
    observing the stained sample with a scanning electron microscope.

2. The method of observing a biological tissue sample according to claim 1, wherein the stretching of the sample on the slide glass is performed at a temperature of 45° C. to 55° C.

3. The method of observing a biological tissue sample according to claim 1, wherein the cutting out of the sample from the sample block is performed using a microtome replacement blade having a blade edge angle of 22°.

4. The observation method according to claim 1, wherein an image based on a signal of secondary electrons generated from the sample is observed with the scanning electron microscope.

5. The method of observing a biological tissue sample according to claim 4, wherein ionic liquid is further added to the stained sample.

6. The observation method according to claim 4, wherein in the scanning electron microscope, a plurality of images in which incident angles of electron beams on the sample are different are obtained.

7. The observation method according to claim 4, wherein in the scanning electron microscope, a plurality of images in which tilt angles of the sample are different are obtained.

8. The observation method according to claim 1, wherein an image based on a signal of back-scattered electrons generated from the sample is observed with the scanning electron microscope.

9. The observation method according to claim 8, wherein a back-scattered electron detector is divided into a plurality of parts according to azimuth angles of the back-scattered electrons, and images are formed independently for each azimuth angle.

10. The observation method according to claim 1, wherein an image based on a signal obtained by adding a signal of secondary electrons generated from the sample and a signal of back-scattered electrons generated from the sample is observed with the scanning electron microscope.

11. A method of preparing a biological tissue sample for observation with a scanning electron microscope, comprising:
    cutting out a sample having a thickness of 15 to 50 µm from a sample block obtained by fixing, dehydrating, and paraffin-embedding a sample cut out from a biological tissue;
    transferring the sample to a slide glass;
    stretching the sample on the slide glass, and performing deparaffinization processing; and
    then, staining the sample with a heavy metal-based staining agent.

12. The method of preparing a biological tissue sample according to claim 11, wherein the stretching of the sample on the slide glass is performed at a temperature of 45° C. to 55° C.

13. The method of preparing a biological tissue sample according to claim 11, wherein the cutting out of the sample from the sample block is performed using a microtome replacement blade having a blade edge angle of 22°.

* * * * *